(12) United States Patent
Ogawa et al.

(10) Patent No.: US 7,472,880 B2
(45) Date of Patent: Jan. 6, 2009

(54) DISPLAY DEVICE

(75) Inventors: Masuo Ogawa, Daito (JP); Yuuya Tanaka, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 97 days.

(21) Appl. No.: 11/439,435

(22) Filed: May 24, 2006

(65) Prior Publication Data

US 2007/0018061 A1    Jan. 25, 2007

(30) Foreign Application Priority Data

May 26, 2005   (JP) .............................. 2005-003692

(51) Int. Cl.
*A47G 1/24* (2006.01)
(52) U.S. Cl. ...................... 248/455; 248/917
(58) Field of Classification Search ................ 361/681; 248/454, 455, 457, 463, 917, 919, 920, 921, 248/922, 923, 124.1
See application file for complete search history.

(56) References Cited

U.S. PATENT DOCUMENTS 6,570,627 B1 * 5/2003 Chang ........................ 348/794
6,971,622 B2 * 12/2005 Ziegler et al. ............... 248/454
2005/0001114 A1 * 1/2005 Ogawa ....................... 248/127

FOREIGN PATENT DOCUMENTS

| JP | 61-83385 | 6/1986 |
| JP | U3065530 | * 10/1999 |

* cited by examiner

*Primary Examiner*—Ramon O Ramirez
(74) *Attorney, Agent, or Firm*—Global IP Counselors, LLP

(57) ABSTRACT

To prevent the occurrence of a situation in which a main stand component supporting a main display component from the rear closes and the main display component falls over backward when a main display component that has been placed in a tilted orientation is pushed to the rear. A locking mechanism 7 for keeping a main stand component 4 in a working orientation is added to a display device having a main display component 1 and a main stand component 4 that is attached to the main display component 1 and opens and closes between a storage orientation and a working orientation. The locking mechanism 7 has an engagement body 72 that is constantly biased toward a locked position by a spring 73. A control tab 75 is provided to the engagement body 72.

13 Claims, 5 Drawing Sheets

DISPLAY DEVICE

CROSS-REFERENCE TO RELATED APPLICATIONS

This application claims priority to Japanese Utility Model Application No. 2005-3692. The entire disclosure of Japanese Utility Model Application No. 2005-3692 is hereby incorporated herein by reference.

BACKGROUND OF THE INVENTION

1. Field of the Invention

The present invention generally relates to a display device. More specifically, the present invention relates to a display device constituted such that a main display component can be put in a tilted orientation by the pushing together of a main display component and a stand unit attached to the main display component.

2. Background Information

In the past, it has been proposed that a main display component having a forward-facing liquid crystal display screen can be tilted by attaching a stand unit to the main display component. The structure of this will be described briefly through reference to FIG. 5A. In FIG. 5A, 1 is a main display component having a forward-facing display screen 12, and 2 is a stand unit. The stand unit 2 is equipped with an attachment base 3 affixed to the back of a main display component 1, and a main stand component 4 attached to the base 3 via a lateral shaft 31. The main stand component 4 is capable of opening and closing around the lateral shaft 31 between a working orientation, in which the main stand component 4 is pulled out diagonally downward from the main display component 1 so as to support from the rear the main display component 1, which is placed in a tilted orientation on a placement surface, such as a table top or the floor, and a storage orientation, in which the main stand component 4 is stored flush with the back of the main display component 1. In FIG. 5A, the working orientation of the main stand component 4 is indicated by solid lines, while the storage orientation is indicated by imaginary lines.

Meanwhile, it has been proposed that an elevating mechanism be provided to a television stand, and the television stand be designed so that it can be tilted right or left, so that the television can be turned to the right or left and moved up and down to make it easier to watch (see Japanese Laid-Open Utility Model Application S61-83385, for example). With the elevating mechanism proposed in Japanese Laid-Open Utility Model Application S61-83385, tooth holes are provided at a plurality of places in an articulated plate fixed to a fixing ring in which a television is held, a stopper that is elastically biased by a spring is provided to a support column to which the articulated plate is pivotably linked, and the fixing ring is pivoted so that the stopper fits into one of the tooth holes in the articulated plate, allowing the fixing ring to be supported at the desired elevation angle.

With the display device described through reference to FIG. 5A, when the main stand component 4 of the stand unit 2 is opened to the working orientation as indicated by the solid lines, and the main display component 1 and the main stand component 4 are placed on a placement surface F, the main display component 1 and the main stand component 4 push against each other and balance in a tilted orientation, so the main display component 1 is kept in a constant tilted orientation.

However, while the main display component 1 is kept in the tilted orientation, if the main display component 1 should be pushed backward by some kind of external force as shown by the arrow L in FIG. 5A, the opening angle of the main display component 1 and the main stand component 4 will steadily decrease as shown in FIG. 5B, and the pushing balance may be lost and the whole assembly fall over backward as shown by the arrow D in FIG. 5C. A situation such as this can occur, for instance, when the main display component 1 is set up in a tilted orientation on a table top or the floor and the main display component 1 is accidentally pushed backward by hand while the user is watching images on the liquid crystal display screen 12. In particular, when a location near the bottom end of the main display component 1 (a location near the placement surface F) is pushed, or when the surface of the placement surface F is not slippery, or when the bottom end of the main display component 1 has some kind of non-skid measure for the placement surface F, if the main display component 1 is pushed backward, the main stand component 4 will not move backward along with the main display component 1, and will instead close toward the storage orientation, which causes the main display component 1 to fall backwards. This situation is not improved at all by providing an elevating mechanism such as that described in the above-mentioned Japanese Laid-Open Utility Model Application S61-83385.

In view of the above, it will be apparent to those skilled in the art from this disclosure that there exists a need to provide an improved display device with which a main display component can be stably kept in a tilted orientation, and will not fall over backward, even when pushed to the rear, which is accomplished by a configuration that does not allow the main stand component of a stand unit to close toward the storage orientation if the main display component is pushed to the rear when the main display component is supported from behind by the main stand component so that the two are balanced.

There exists another need to provide an improved display device with which the main stand component of a stand unit is automatically locked in the working orientation when the main stand component is opened from the storage orientation to the working orientation.

There exists yet another need to provide an improved display device with which unlocking can be easily accomplished when a main stand component that has been locked in the working orientation is to be closed and put in the storage orientation.

This invention addresses these needs in the art as well as other needs, which will become apparent to those skilled in the art from this disclosure.

SUMMARY OF THE INVENTION

The display device pertaining to the present invention comprises a main display component having a forward-facing display screen, and a stand unit that is attached to the main display component. The stand unit have a main stand component that is capable of opening and closing around a lateral shaft between a working orientation, in which the main stand component is pulled out diagonally downward from the main display component so as to support from the rear the main display component which is placed in a tilted orientation on a placement surface, and a storage orientation, in which the main stand component is stored flush with the back of the main display component. There is further added a locking mechanism that is capable of switching between a locked state in which the main stand component that has been opened to the working orientation is maintained in the working orientation and an unlocked state in which the locked state is released and the main stand component is permitted to open and close between the working orientation and the storage orientation.

With this constitution, the main stand component is kept in the working orientation when the locking mechanism has been switched to a locked state. In this locked state, if the main display component in a tilted orientation is pushed to the rear on the placement surface, the main stand component does not close, and instead moves backward over the placement surface along with the main display component, which maintains the placement stability of the main display component in the tilted orientation and also ensures good safety. Also, when the locking mechanism is switched to an unlocked state, the main stand component can be opened and closed between the storage orientation and the working orientation, so the main stand component can be closed to the storage orientation to put away the main display component, or the main stand component can be opened to the working orientation so that the main display component can be set up in a tilted orientation.

With the present invention, it is possible to employ a constitution in which the above-mentioned locking mechanism switches from the unlocked state to the locked state in conjunction with the opening of the main stand component from the storage orientation to the working orientation, and switches from the locked state to the unlocked state through a manual switching operation. This allows the main stand component to be automatically locked in the working orientation by opening the main stand component from the storage orientation to the working orientation.

With the present invention, it is preferable to employ a constitution in which the stand unit has the main stand component and an attachment base for attaching the main stand component to the main display component. The locking mechanism is equipped with an engagement body that is attached to the base and is capable of extension and retraction between a locked position in which the engagement body is engaged with the main stand component that has been opened to the working orientation and thereby prevents the closure thereof, and an unlocked position in which the engagement body is retracted from the locked position. This gives a locking mechanism with a simple structure and a comprehensible usage state, that is easy to use.

With the present invention, it is preferable if the engagement body is constantly elastically biased toward the locked position, and the main stand component is equipped with a receiving face that hits the engagement body when the main stand component is closed to the storage orientation, and thereby prevents the engagement body from protruding to the locked position. This gives a specific constitution for automatically locking the main stand component in the working orientation by opening the main stand component from the storage orientation to the working orientation.

With the present invention, it is preferable if a control tab for retracting the engagement body from the locked position to the unlocked position is provided integrally with the engagement body. This allows the locking mechanism to be switched from the locked state to the unlocked state by manually operating the control tab.

With the present invention, it is possible to employ a constitution in which the main stand component has a case openably and closeably attached to the base via the lateral shaft and a leg that extends downward from the case. The case is equipped with a latching face engaged by the engagement body protruding to the locked position and the receiving face formed by the side face of the case. With this constitution, because the latching face and the receiving face are formed on the side face of the case, the case does not have to be any larger, and this contributes to making the stand unit more compact. This effect is particularly pronounced when a constitution is employed in which the above-mentioned latching face is formed by the inner face of a recess provided in the side face of the case.

The display device pertaining to the present invention is embodied even more by a display device comprising a main display component having a forward-facing display screen, and a stand unit that is attached to this main display component. The stand unit havs a main stand component that is capable of opening and closing around a lateral shaft between a working orientation, in which the main stand component is pulled out diagonally downward from the main display component so as to support from the rear the main display component which is placed in a tilted orientation on a placement surface, and a storage orientation, in which the main stand component is stored flush with the back of the main display component, and an attachment base for attaching the main stand component to the main display component. The main stand component has a case openably and closeably attached to the base via the lateral shaft, and a leg that extends downward from the case, and a locking mechanism being capable of switching between a locked state in which the main stand component is maintained in the working orientation and an unlocked state in which the locked state is released and the main stand component is permitted to open and close between the working orientation and the storage orientation. The locking mechanism includes a latching face formed by the inner face of a recess provided to the side face of the case, an engagement body that is slidably attached to the case and is capable of extension and retraction between a locked position in which the engagement body is engaged with the latching face when the main stand component is open to the working orientation, and thereby maintains the main stand component in the working orientation, and an unlocked position in which the engagement body is retracted from the locked position so that the main stand component is permitted to open and close between the working orientation and the storage orientation, a spring that is interposed between the engagement body and the base and that constantly elastically biases the engagement body toward the locked position, a receiving face that is provided to the side face of the case and that hits the engagement body when the main stand component is closed to the storage orientation, and thereby prevents the engagement body from protruding to the locked position, and a control tab that is integrally provided to the engagement body, for retracting the engagement body from the locked position to the unlocked position.

With the present invention, since the locking mechanism in the locked state maintains the working orientation of the main stand component, even if the main display component should be pushed backward while the main stand component is supporting the main display component in a tilted orientation, the main stand component will not close toward the storage orientation, which would compromise placement stability and safety, nor will the main display component fall over backwards. Accordingly, if the user should accidentally push on the main display component, the main display component will not fall over backward and prevent the user from enjoying the program being shown, nor will the main display component be damaged by the impact of falling over.

Also, with a constitution in which the main stand component is automatically locked in the working orientation by opening the main stand component from the storage orientation to the working orientation, the user is saved the trouble of having to open the main stand component to the working orientation and manually put the locking mechanism in the locked state, which prevents situations in which the main display component falls over backward because the user forgot to lock it.

Furthermore, with the display device of the present invention, the constitution of the locking mechanism can be easily simplified by including in the locking mechanism the engagement body that is attached to the base, so assembly of the locking mechanism can be accomplished simply. Therefore, adding the locking mechanism does not adversely affect mass production of the display device.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be described with reference to the drawings. It will be apparent to those skilled in the art from this disclosure that the following descriptions of the embodiments of the present invention are provided for illustration only, and not for the purpose of limiting the invention as defined by the appended claims and their equivalents.

Figure 1:
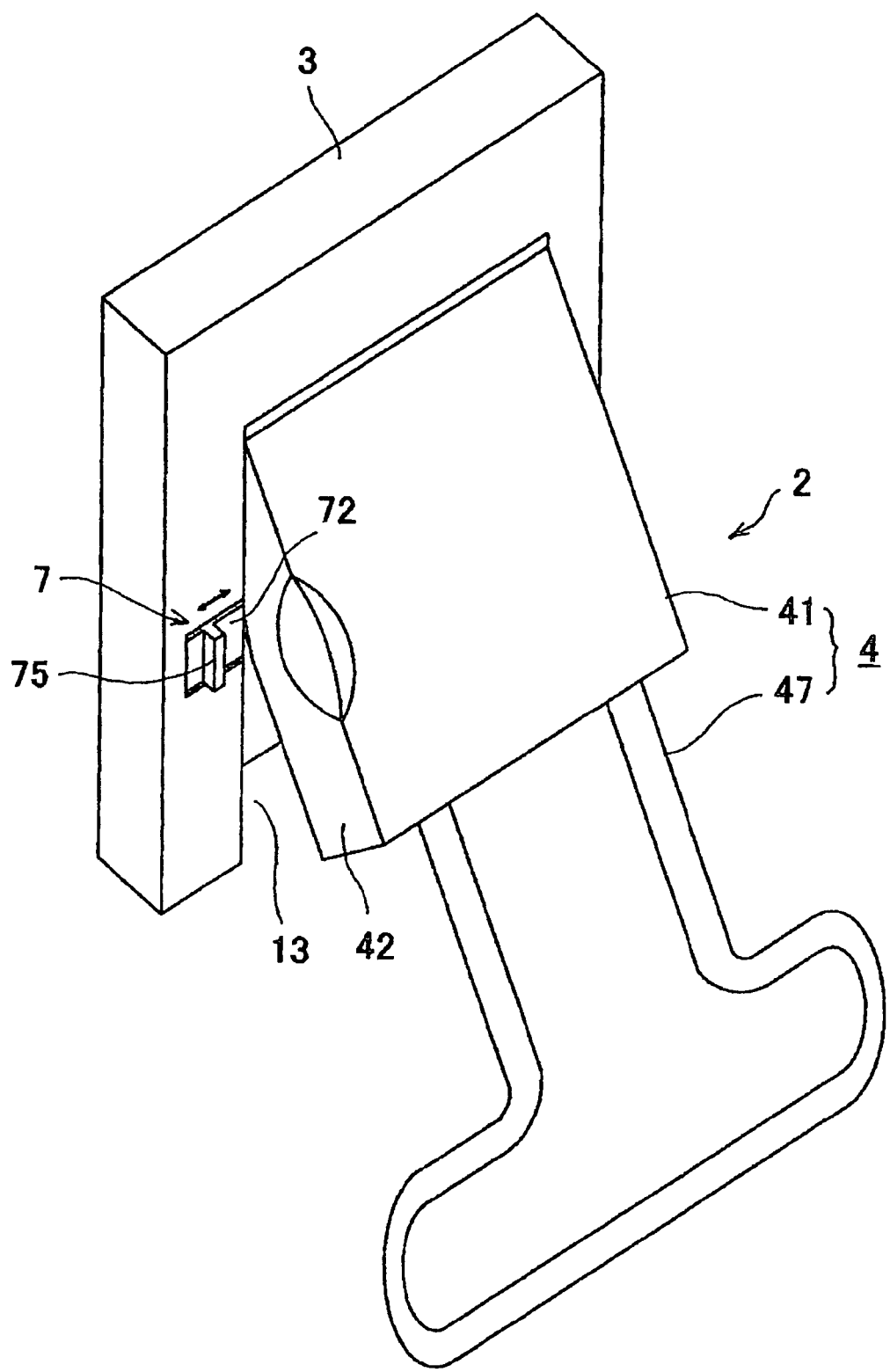
FIG. 1 is a simplified oblique view, from the rear, of the display device pertaining to an embodiment of the present invention.
Figures 2A, 2B:
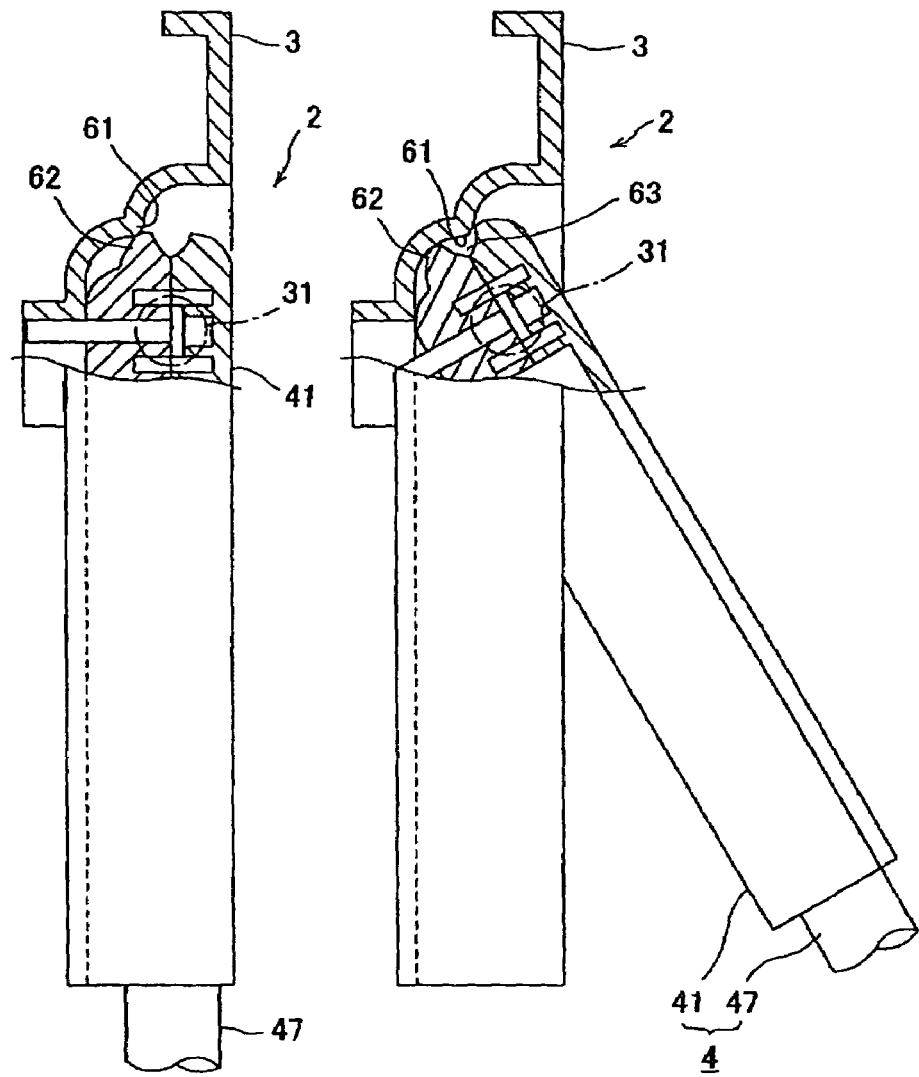
FIG. 2A is a simplified side view that has been partially cut away to illustrate the state when the main stand component of the stand unit has been closed to the storage orientation.
FIG. 2B is a simplified side view that has been partially cut away to illustrate the state when the same main stand component has been opened to the working orientation.
Figure 3:
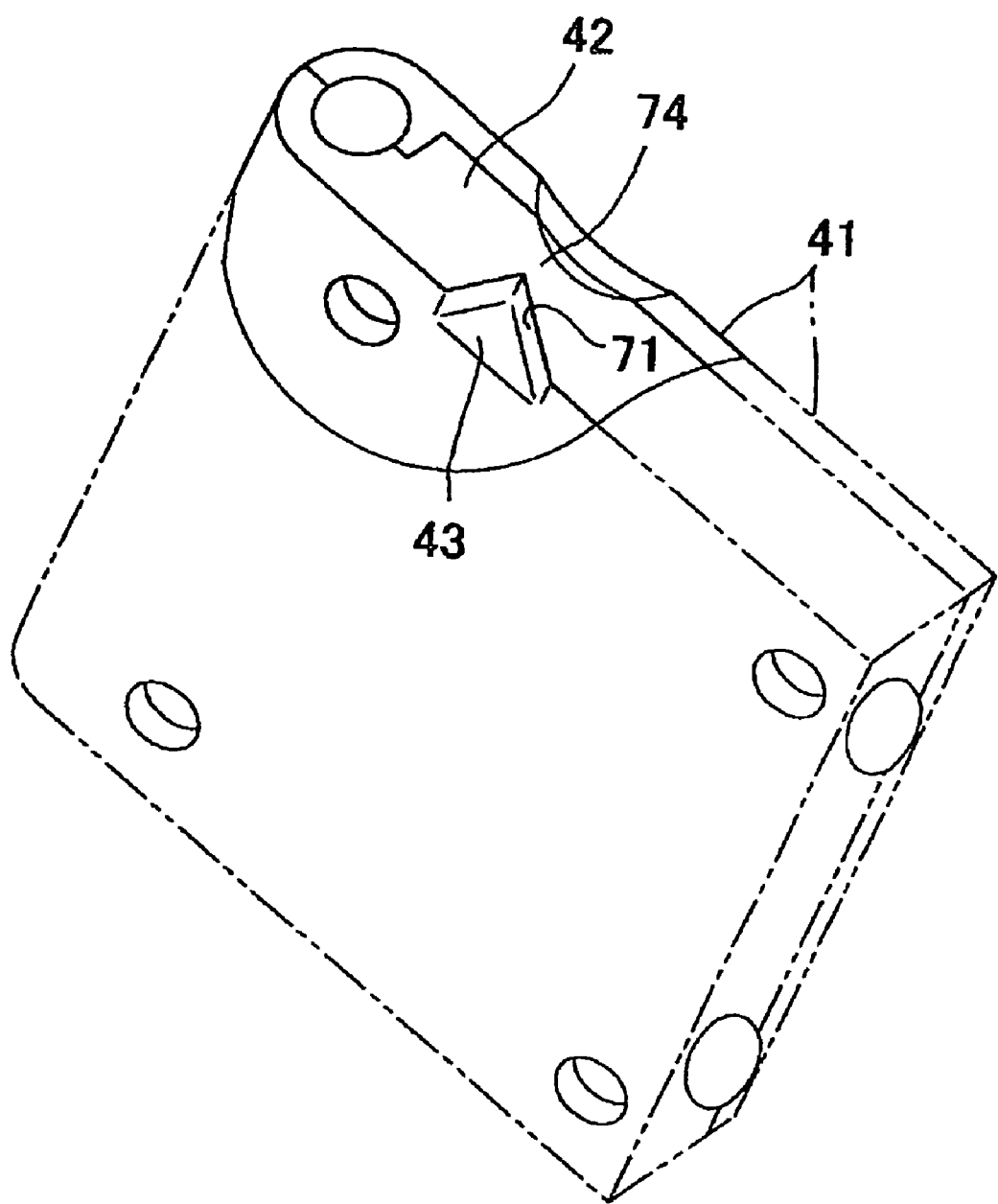
FIG. 3 is a simplified oblique view of a case.
Figure 4A:
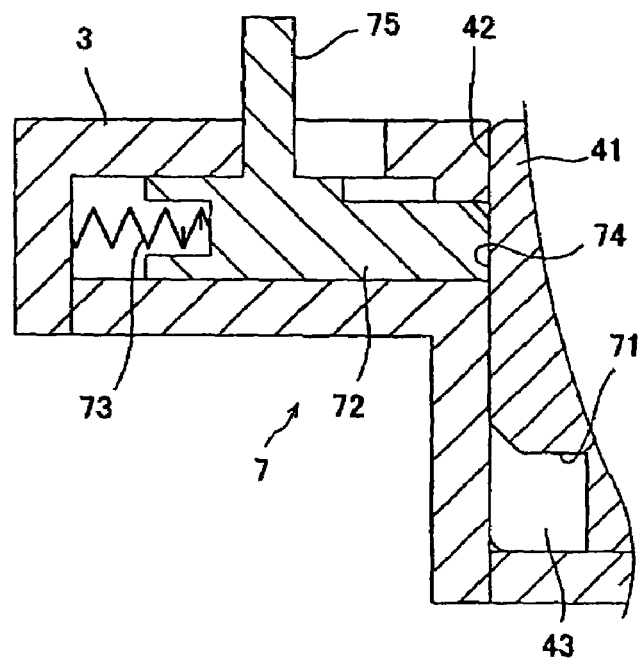
FIG. 4A is a cross section illustrating the structure and action of a locking mechanism in the unlocked state.
Figure 4B:
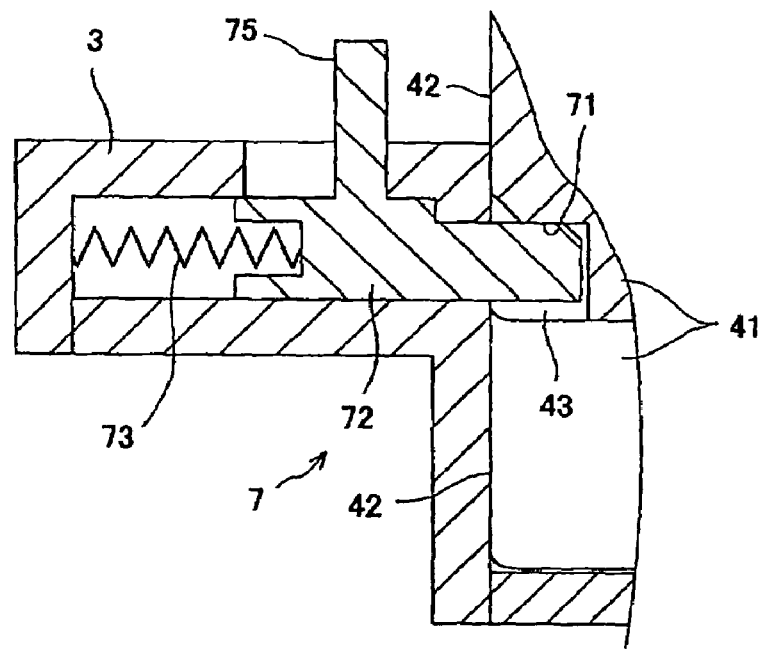
FIG. 4B is a cross section illustrating the structure and action of a locking mechanism in the locked state.

FIG. 1 is a simplified oblique view, from the rear, of the display device pertaining to an embodiment of the present device. FIGS. 2A and 2B are simplified side views that have been partially cut away to illustrate the mechanism for positioning the main stand component 4 of the stand unit 2 in the storage orientation and the working orientation. FIG. 3 is a simplified oblique view of a case 41. FIGS. 4A and 4B are cross sections illustrating the structure and action of a locking mechanism 7.

As shown in FIG. 1, the stand unit 2 is attached to the back of the main display component 1, which is flat and equipped with a liquid crystal module that forms a forward-facing display screen. The stand unit 2 is equipped with the attachment base 3 shown in FIGS. 2A and 2B, and the base 3 is screwed to the back of the main display component 1. The stand unit 2 is further equipped with the main stand component 4 having the case 41, which is attached to the base 3 via the lateral shaft 31, and a leg 47 that extends downward from the case 41. The main stand component 4 is capable of opening and closing around the lateral shaft 31 between a working orientation (the orientation indicated by the solid lines in FIG. 5A), in which the main stand component 4 is pulled out diagonally downward from the back of the main display component so as to support from the rear the main display component which is placed in a tilted orientation on a placement surface (not shown), and a storage orientation (the orientation indicated by the imaginary lines in FIG. 5A), in which the main stand component 4 is stored in the concave portion 13 (see FIG. 1) provided to the back side of the main display component 1 and is flush with the back of the main display component 1.

As shown in FIGS. 2A and 2B, a convex engagement component 61 that is elastic and positioned at a location near the lateral shaft 31 is formed at the upper end of the base 3, while a peaked cam component 62 is formed at a location opposite the engagement component 61 at the top of the case 41. When the main stand component 4 is closed to the storage orientation, as shown in FIG. 2A, the engagement component 61 on the base 3 elastically exerts pressure on the peaked cam component 62 of the case 41, so that the main stand component 4 is biased in its closing direction. Conversely, when the main stand component 4 is opened to the working orientation, as shown in FIG. 2B, a recess 63 formed adjacent to the peaked cam component 62 of the case 41 ends up facing the engagement component 61 on the base 3 side, the peaked cam component 62 engages with the engagement component 61, and the main stand component 4 is kept in the working orientation. Therefore, the stand unit 2 is capable of artificially opening and closing between two positions, namely, a position of being closed to the storage orientation and a position of being opened to the working orientation, and also has the function of keeping the main stand component 4 in its current orientation, be it the storage orientation or the working orientation. Also, the opening and closing of the main stand component 4 can be accomplished with the hands using just the strength of the user. The leg 47 can be extended from or retracted into the case 41, and the effective length of the leg 47 changes depending on whether the leg 47 is protruding from or retracted into the case 41, which allows the tilt angle of the main display component 1 to be varied.

Next, the locking mechanism 7 will be described through reference to FIGS. 1, 3, and 4. The locking mechanism 7 in these drawings is equipped with a latching face 71 formed by the inner face of a triangular recess 43 provided to a side face 42 of the case 41, an engagement body 72 slidably attached to the base 3, a spring 73 that is a coil spring which is interposed between the engagement body 72 and the base 3 and constantly elastically biases the engagement body 72 toward the locked position (discussed below), a receiving face 74 that is provided to the side face 42 of the case 41, hits the engagement body 72 when the main stand component 4 is closed to the storage orientation, and thereby prevents the engagement body 72 from protruding to the locked position, and a control tab 75 that is integrally provided to the engagement body 72, for retracting the engagement body 72 from the locked position to the unlocked position (discussed below). The "locked position" of the engagement body 72 here refers to the position where the main stand component 4 is kept in the working orientation upon engaging with the latching face 71 inside the recess 43 as shown in FIG. 4B when the main stand component 4 is opened to the working orientation, also as shown in FIG. 4B. The "unlocked position" is the position where the engagement body 72 has been retracted from the locked position and the main stand component 4 is permitted to open and close between the working orientation and the storage orientation.

Figure 5A:
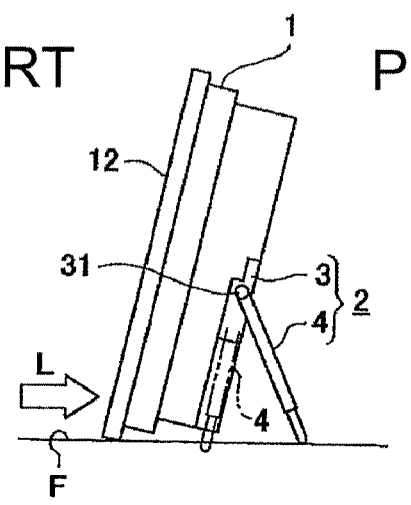
FIGS. 5A, 5B, and 5C are diagrams of the situation that can occur when a main stand component which has been placed in a tilted orientation is pushed.
Figure 5B:
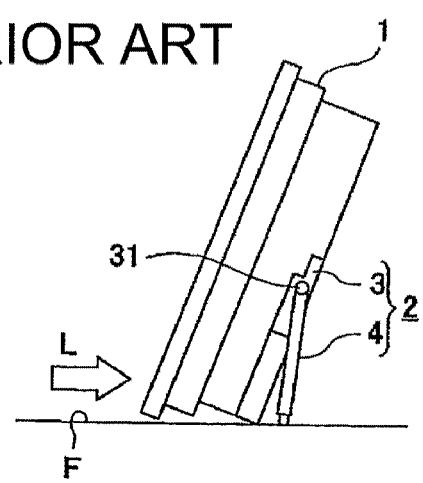
Figure 5C:
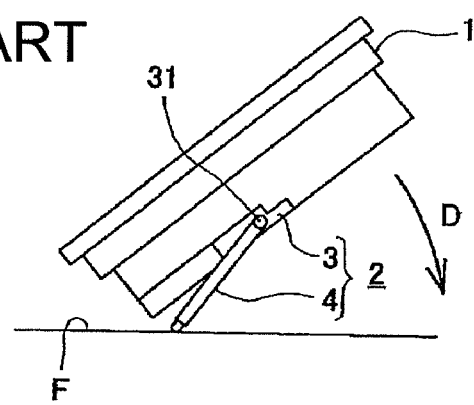

With a display device constituted as above, when the main stand component 4 is opened to the working orientation and the main display component 1 and the main stand component 4 are placed on the placement surface F as shown in FIG. 5A, the main display component 1 and the main stand component 4 push against each other and are balanced in a tilted orientation, which keeps the main display component 1 in a constant tilted orientation. Furthermore, the engagement body 72 of the locking mechanism 7 protrudes to the locked position and enters the recess 43 as shown in FIG. 4B, and engages the latching face 71, which is the inner face of the recess 43, which keeps the main stand component 4 in the working orientation. This is a locked state. Therefore, even if the main display component 1 should be pushed to the rear by some kind of external force as indicated by the arrow L in FIG. 5A, the main stand component 4 will still not close toward the storage orientation. This means that even if the main display component 1 is pushed and moves backward, the main stand component 4 will not close and will instead slide backward over the placement surface F along with the main display component 1. This maintains the placement stability and safety of the main display component 1, so the main display component 1 will not fall over backward and prevent the user from viewing the display screen of the main display component 1, nor will the main display component be damaged by the impact of falling over.

Also, when the main stand component 4 is opened from the storage orientation to the working orientation, the engagement body 72, which hits the receiving face 74 of the case 41 and is kept in the unlocked position when the main stand component 4 is closed to the storage orientation, slides on the receiving face 74 of the case 41 in conjunction with the opening of the main stand component 4 and automatically protrudes to the locked position under the biasing force of the spring 73 when the main stand component 4 is opened to the working orientation, so the user merely has to open the main stand component 4, which prevents situations in which the main display component 1 falls over because the user forgot to lock it.

Then, when the main stand component 4 is to be stowed away, the control tab 75 of the locking mechanism 7 is moved with the fingers and the engagement body 72 is retracted against the biasing of the spring 73 from the locked position to the unlocked position, after which the main stand component 4 is closed from the working orientation to the storage orientation. When the main stand component 4 is thus closed, the engagement body 72 that is biased by the spring 73 hits the receiving face 74 of the case 41 and maintains the unlocked state as shown in FIG. 4A.

With this embodiment, the locking mechanism 7 is formed by the latching face 71 on the case 41 side, the engagement body 72 that is slidably provided to the base 3 and is protrusively equipped with the control tab 75 in a place where the control tab 75 can be manually operated, the spring 73 that is a coil spring, and the receiving face 74 on the case 41 side, and the latching face 71 and the receiving face 74 are provided to the side face of the case 41, so providing the locking mechanism 7 does not make the case 41 any larger, and since the locking mechanism 7 itself has an extremely simple structure, adding the locking mechanism 7 does not adversely affect mass production of the display device.

In FIGS. 1 to 5, those components that are the same or equivalent are numbered the same.

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Terms that are expressed as "means-plus function" in the claims should include any structure that can be utilized to carry out the function of that part of the present invention. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A display device comprising:
  a main display component having a forward-facing display screen; and
  a stand unit being attached to the main display component and having a main stand component that is capable of opening and closing around a lateral shaft between a working orientation, in which the main stand component is pulled out diagonally downward from the main display component so as to support from the rear the main display component which is placed in a tilted orientation on a placement surface, and a storage orientation, in which the main stand component is stored flush with the back of the main display component, and an attachment base for attaching the main stand component to the main display component;
  wherein the main stand component has a case openably and closeably attached to the base via the lateral shaft, a leg that extends downward from the case, and a locking mechanism being capable of switching between a locked state in which the main stand component is maintained in the working orientation and an unlocked state in which the locked state is released and the main stand component is permitted to open and close between the working orientation and the storage orientation; and
  the locking mechanism includes a latching face formed by the inner face of a recess provided to the side face of the case; an engagement body that is slidably attached to the case and is capable of extension and retraction between a locked position in which the engagement body is engaged with the latching face when the main stand component is open to the working orientation, and thereby maintains the main stand component in the working orientation, and an unlocked position in which the engagement body is retracted from the locked position so that the main stand component is permitted to open and close between the working orientation and the storage orientation; a spring that is interposed between the engagement body and the base and that constantly elastically biases the engagement body toward the locked position; a receiving face that is provided to the side face of the case and that hits the engagement body when the main stand component is closed to the storage orientation, and thereby prevents the engagement body from protruding to the locked position; and a control tab that is integrally provided to the engagement body, for retracting the engagement body from the locked position to the unlocked position.

2. A display device comprising:

a main display component having a forward-facing display screen;

a stand unit attached to the main display component and having a main stand component that is capable of opening and closing around a lateral shaft between a working orientation, in which the main stand component is pulled out diagonally downward from the main display component so as to support from the rear the main display component which is placed in a tilted orientation on a placement surface, and a storage orientation, in which the main stand component is stored flush with the back of the main display component; and a locking mechanism configured to switch between a locked state in which the main stand component that has been opened to the working orientation is maintained in the working orientation and an unlocked state in which the locked state is released and the main stand component is permitted to open and close between the working orientation and the storage orientation, the locking mechanism being movable into a space formed between the main display component and the main stand component when the main stand component is in the working orientation.

3. A display device comprising:

a main display component having a forward-facing display screen;

a stand unit attached to the main display component and having a main stand component that is capable of opening and closing around a lateral shaft between a working orientation, in which the main stand component is pulled out diagonally downward from the main display component so as to support from the rear the main display component which is placed in a tilted orientation on a placement surface, and a storage orientation, in which the main stand component is stored flush with the back of the main display component; and a locking mechanism configured to switch between a locked state in which the main stand component that has been opened to the working orientation is maintained in the working orientation and an unlocked state in which the locked state is released and the main stand component is permitted to open and close between the working orientation and the storage orientation, the locking mechanism being biased in a direction parallel to the lateral shaft, and being further configured to switch from the unlocked state to the locked state in conjunction with the opening of the main stand component from the storage orientation to the working orientation with the opening of the main stand component causing the locking mechanism to move in a direction of a biasing force, and switch from the locked state to the unlocked state through a manual switching operation that moves the locking mechanism in a direction opposite the biasing force.

4. A display device comprising:

a main display component having a forward-facing display screen;

a stand unit attached to the main display component and having a main stand component that is capable of opening and closing around a lateral shaft between a working orientation, in which the main stand component is pulled out diagonally downward from the main display component so as to support from the rear the main display component which is placed in a tilted orientation on a placement surface, and a storage orientation, in which the main stand component is stored flush with the back of the main display component; and a locking mechanism configured to switch between a locked state in which the main stand component that has been opened to the working orientation is maintained in the working orientation and an unlocked state in which the locked state is released and the main stand component is permitted to open and close between the working orientation and the storage orientation, the stand unit further having an attachment base for attaching the main stand component to the main display component, the locking mechanism being further configured to switch from the unlocked state to the locked state in conjunction with the opening of the main stand component from the storage orientation to the working orientation, and switch from the locked state to the unlocked state through a manual switching operation, and the locking mechanism being equipped with an engagement body that is attached to the base and is capable of extension and retraction between a locked position in which the engagement body is engaged with the main stand component that has been opened to the working orientation and thereby prevents the closure thereof, and an unlocked position in which the engagement body is retracted from the locked position.

5. The display device according to claim 4, wherein the engagement body is constantly elastically biased toward the locked position, and the main stand component is equipped with a receiving face that hits the engagement body when the main stand component is closed to the storage orientation, and thereby prevents the engagement body from protruding to the locked position.

6. The display device according to claim 5, wherein a control tab for retracting the engagement body from the locked position to the unlocked position is provided integrally with the engagement body.

7. The display device according to claim 6, wherein the main stand component has a case openably and closeably attached to the base via the lateral shaft and a leg that extends downward from the case, and the case is equipped with a latching face engaged by the engagement body protruding to the locked position and the receiving face formed by the side face of the case.

8. The display device according to claim 7, wherein the latching face is formed by the inner face of a recess provided to the side face of the case.

9. The display device according to claim 5, wherein the main stand component has a case openably and closeably attached to the base via the lateral shaft and a leg that extends downward from the case, and the case is equipped with a latching face engaged by the engagement body protruding to the locked position and the receiving face formed by the side face of the case.

10. The display device according to claim 9, wherein the latching face is formed by the inner face of a recess provided to the side face of the case.

11. The display device according to claim 4, wherein a control tab for retracting the engagement body from the locked position to the unlocked position is provided integrally with the engagement body.

12. The display device according to claim 11, wherein the main stand component has a case openably and closeably attached to the base via the lateral shaft and a leg that extends downward from the case, and the case is equipped with a latching face engaged by the engagement body protruding to the locked position and the receiving face formed by the side face of the case.

13. The display device according to claim 12, wherein the latching face is formed by the inner face of a recess provided to the side face of the case.

\* \* \* \* \*